US012049406B2

(12) United States Patent
Dou et al.

(10) Patent No.: US 12,049,406 B2
(45) Date of Patent: Jul. 30, 2024

(54) METHOD OF PRODUCING BORON TRICHLORIDE

(71) Applicant: SHOWA DENKO K.K., Tokyo (JP)

(72) Inventors: Jun Dou, Tokyo (JP); Saki Mouri, Tokyo (JP); Hideyuki Kurihara, Tokyo (JP)

(73) Assignee: Resonac Corporation, Tokyo (JP)

( * ) Notice: Subject to any disclaimer, the term of this patent is extended or adjusted under 35 U.S.C. 154(b) by 879 days.

(21) Appl. No.: 17/054,548

(22) PCT Filed: Jun. 4, 2019

(86) PCT No.: PCT/JP2019/022195
§ 371 (c)(1),
(2) Date: Nov. 11, 2020

(87) PCT Pub. No.: WO2020/003925
PCT Pub. Date: Jan. 2, 2020

(65) Prior Publication Data
US 2021/0230010 A1    Jul. 29, 2021

(30) Foreign Application Priority Data
Jun. 26, 2018    (JP) ................................. 2018-121138

(51) Int. Cl.
C01B 35/06    (2006.01)

(52) U.S. Cl.
CPC ........ C01B 35/061 (2013.01); C01P 2004/61 (2013.01)

(58) Field of Classification Search
CPC . C01B 35/061; C01B 32/991; C01P 2004/61; C01P 2004/60
See application file for complete search history.

(56) References Cited

U.S. PATENT DOCUMENTS 3,025,138 A * 3/1962 Davis ...................... C01B 35/06
423/292
2019/0330069 A1    10/2019 Mouri et al.

FOREIGN PATENT DOCUMENTS

| CN | 103506056 A | 1/2014 | |
| EP | 3 476 804 A1 | 5/2019 | |
| GB | 2304104 A * | 3/1997 | ........... C01B 35/061 |
| JP | 58020715 A * | 2/1983 | |
| JP | 2009-227517 A | 10/2009 | |
| JP | 6984446 B2 * | 12/2021 | |

(Continued)

OTHER PUBLICATIONS

International Preliminary Report on Patentability dated Dec. 29, 2020 with a translation of the Written Opinion from the International Bureau in International Application No. PCT/JP2019/022195.

(Continued)

Primary Examiner — Daniel Berns
Assistant Examiner — Syed T Iqbal
(74) Attorney, Agent, or Firm — Sughrue Mion, PLLC

(57) ABSTRACT

There is provided a method of producing boron trichloride, in which damage to a reaction container is inhibited. The method of producing boron trichloride includes performing reaction between chlorine gas in a gas containing the chlorine gas and particulate boron carbide (4) in a state in which the boron carbide (4) flows in the gas containing the chlorine gas.

14 Claims, 3 Drawing Sheets

(56) References Cited

FOREIGN PATENT DOCUMENTS

| | | |
|---|---|---|
| RU | 2243155 C1 | 12/2004 |
| RU | 2003123876 A | 1/2005 |
| TW | 201808806 A | 3/2018 |
| WO | 2008/136681 A1 | 11/2008 |
| WO | 2014/000592 A1 | 1/2014 |
| WO | 2017/221642 A1 | 12/2017 |
| WO | WO-2017221642 A1 * 12/2017 | ........... C01B 35/061 |

OTHER PUBLICATIONS

International Search Report for PCT/JP2019/022195 dated Aug. 6, 2019 [PCT/ISA/210].
Database WPI Week Dec. 2005, XP002803617, Thomson Scientific, Dec. 27, 2004 (1 page total).
Database WPI Week Apr. 2018, XP002803620, Thomson Scientific, Dec. 28, 2017 (2 pages total).
Extended European Search Report issued Jul. 23, 2021 in European Application No. 19824505.2.

* cited by examiner

METHOD OF PRODUCING BORON TRICHLORIDE

CROSS REFERENCE TO RELATED APPLICATIONS

This application is a National Stage of International Application No. PCT/JP2019/022195 filed Jun. 4, 2019, claiming priority based on Japanese Patent Application No. 2018-121138 filed Jun. 26, 2018.

TECHNICAL FIELD

The present invention relates to a method of producing boron trichloride.

BACKGROUND ART

A method in which boron carbide ($B_4C$) and chlorine gas ($Cl_2$) are allowed to react with each other is known as one of methods of producing boron trichloride ($BCl_3$). The reaction can be represented by the following reaction formula.

$$B_4C + 6Cl_2 \rightarrow 4BCl_3 + C$$

For example, PTL 1 discloses a method in which boron carbide having an average particle diameter of 1 to 4 mm is put in a reaction container, and heated to 600 to 1200° C., followed by introducing chlorine gas to synthesize boron trichloride.

CITATION LIST

Patent Literature

PTL 1: Japanese Patent Publication No. 2009-227517

SUMMARY OF INVENTION

Technical Problem

In the production method disclosed in PTL 1, however, the temperature of the boron carbide reacting with the chlorine gas may locally reach a high temperature of more than 1200° C., the boron carbide is fixed to a determined position in the reaction container and prevented from moving in the reaction, and therefore, heat storage easily occurs in the reaction container. As a result, damage may occur depending on the material of the reaction container.

An object of the present invention is to provide a method of producing boron trichloride, in which damage to a reaction container is inhibited.

Solution to Problem

To solve the problem, one aspect of the present invention is as the following [1] to [7].
- [1] A method of producing boron trichloride, including performing reaction between chlorine gas in a gas containing the chlorine gas and particulate boron carbide in a state in which the boron carbide flows in the gas containing the chlorine gas.
- [2] The method of producing boron trichloride according to [1], wherein the reaction between the chlorine gas in the gas containing the chlorine gas and the boron carbide is continuously performed while continuously supplying the gas containing the chlorine gas and the boron carbide into a reaction container and continuously exhausting a reaction product of the gas containing the chlorine gas and the boron carbide from the reaction container.
- [3] The method of producing boron trichloride according to [1] or [2], wherein the boron carbide has an average particle diameter D50 of less than 500 μm based on a volume.
- [4] The method of producing boron trichloride according to any one of [1] to [3], wherein the reaction between the chlorine gas in the gas containing the chlorine gas and the boron carbide is performed at a temperature of 600° C. or more.
- [5] The method of producing boron trichloride according to any one of [1] to [4], wherein the reaction between the chlorine gas in the gas containing the chlorine gas and the boron carbide is performed under a pressure of −0.050 MPaG or more and 0.500 MPaG or less.
- [6] The method of producing boron trichloride according to any one of [1] to [5], wherein the gas containing the chlorine gas consists of 50% by volume or more and 100% by volume or less of the chlorine gas, and a remainder inert gas.
- [7] The method of producing boron trichloride according to any one of [1] to [6], wherein a content of water vapor in the gas containing the chlorine gas is less than 1% by volume.

Advantageous Effects of Invention

In accordance with the present invention, damage to a reaction container is inhibited. Moreover, continuous reaction enables boron trichloride to be produced at a low cost.

DESCRIPTION OF EMBODIMENTS

Figure 1:
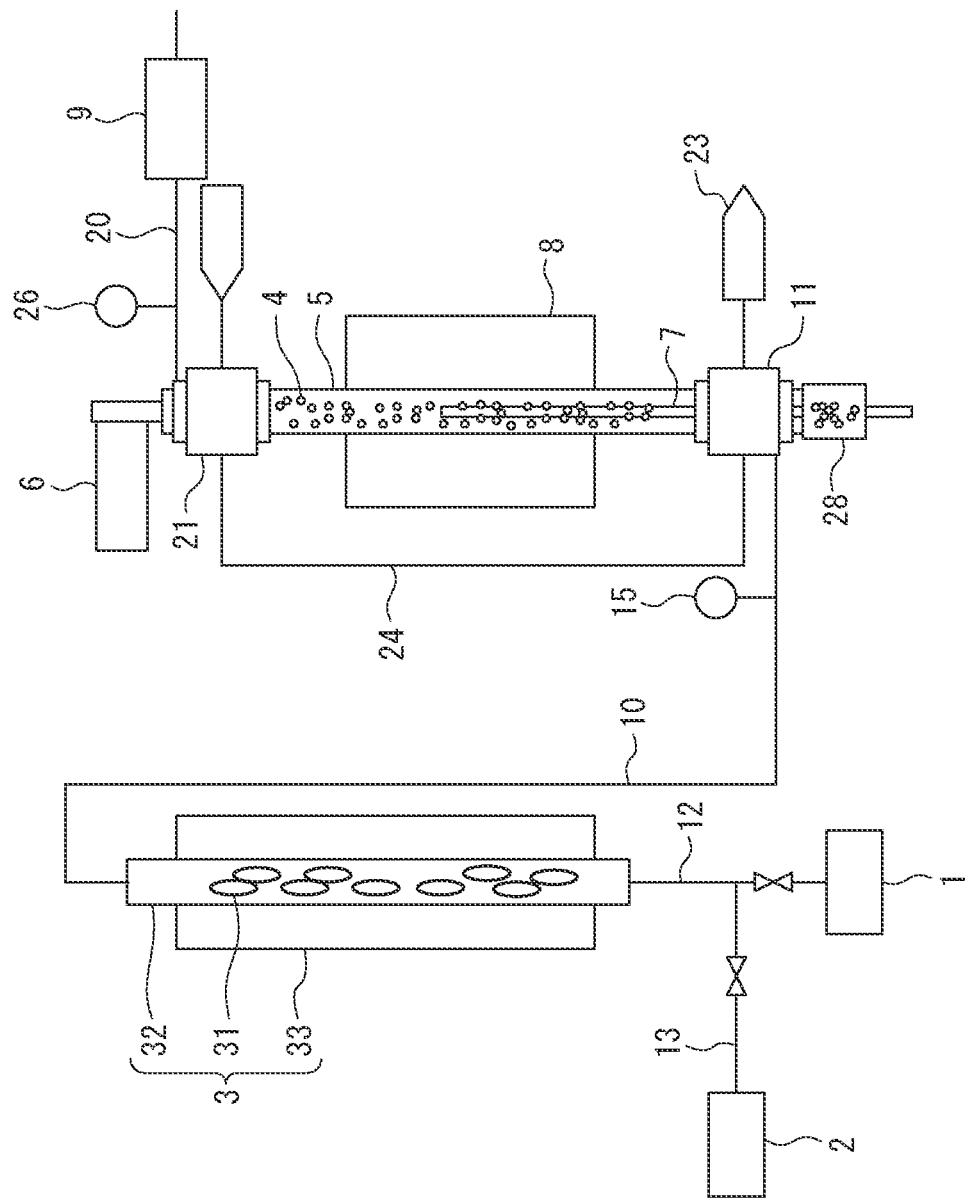
FIG. 1 is a schematic view of an apparatus for producing boron trichloride, explaining a method of producing boron trichloride according to one embodiment of the present invention.

One embodiment of the present invention will be described. The present embodiment describes an example of the present invention, and the present invention is not limited to the present embodiment. Moreover, various modifications or improvements can be made to the present embodiment, and aspects to which such modifications or improvements are made can be encompassed in the present invention. For example, materials, dimensions, and the like described as examples in the present embodiment are presented by way of example only, the present invention is not limited to the materials, the dimensions, and the like, and the materials, the dimensions, and the like can be changed, as appropriate, within a range in which the effects of the present invention are exhibited.

A method of producing boron trichloride according to the present embodiment includes performing reaction between chlorine gas in a gas containing the chlorine gas and particulate boron carbide in a state in which the boron carbide flows in the gas containing the chlorine gas.

When reaction between the chlorine gas in the gas containing the chlorine gas and the boron carbide is performed in a state in which the boron carbide flows in the gas containing the chlorine gas in a reaction container, the boron carbide moves during the reaction without being fixed to a determined position in the reaction container, and therefore, heat storage caused by reaction heat is inhibited from occurring in the reaction container. Therefore, high temperature does not occur locally in the reaction container, and damage to the reaction container is inhibited.

A method of achieving a state in which the boron carbide flows in the gas containing the chlorine gas in the reaction container is not particularly limited. For example, the boron carbide may be blown up and allowed to flow by supplying the gas containing the chlorine gas to the boron carbide loaded in the reaction container. The boron carbide may also be allowed to flow by simultaneously supplying the boron carbide and the gas containing the chlorine gas into the reaction container. Alternatively, the boron carbide may also be allowed to flow by supplying the boron carbide into the reaction container filled with the gas containing the chlorine gas. The state in which the boron carbide flows in the gas containing the chlorine gas can be achieved, for example, by supplying the boron carbide from the upper portion of the reaction container filled with the gas containing the chlorine gas and by dropping the boron carbide from the upper portion of the reaction container toward the bottom portion of the reaction container.

In other words, if the state in which the boron carbide flows in the gas containing the chlorine gas can be achieved, a form in which the boron carbide is introduced into the reaction container may be a vertical introduction form or a horizontal introduction form.

A method in which the boron carbide is supplied into the reaction container is not particularly limited as long as particulate boron carbide can be stably supplied. Examples of the method include a method in which the boron carbide is naturally dropped from a hopper, and a method using a feeder such as a screw feeder, a vibrating feeder, or a circle feeder.

The direction of the introduction of the gas containing the chlorine gas in the case of introducing the gas containing the chlorine gas into the reaction container (i.e., a direction in which the gas containing the chlorine gas flows) is not particularly limited, but it is preferable to introduce the gas containing the chlorine gas in the opposite direction (i.e., opposing direction) with respect to the direction of the movement of the boron carbide. Then, the residence time of the boron carbide can be prolonged to facilitate the reaction of the boron carbide.

The method of producing boron trichloride of the present embodiment can be applied to batch-type (batch-process) reaction or continuous-type reaction. In the case of performing the batch-type reaction, a gas containing chlorine gas and boron carbide is loaded in a reaction container, a reaction product including boron trichloride is exhausted from the reaction container after the end of the reaction between the chlorine gas in the gas containing the chlorine gas and the boron carbide, and the manipulation is repeated in which a gas containing chlorine gas and boron carbide are newly loaded in the reaction container to perform the reaction again.

On the other hand, in the case of performing the continuous-type reaction, the reaction between chlorine gas in a gas containing the chlorine gas and boron carbide is continuously performed while continuously supplying the gas containing the chlorine gas and the boron carbide into a reaction container and continuously exhausting a reaction product including boron trichloride from the reaction container. In other words, all of the loading and reaction of the raw materials, and the recovery of the product are performed simultaneously and continuously.

In the case of the batch-type reaction, productivity may be insufficient because it is necessary to exhaust boron carbide and the like as reaction residues from a reaction container after the reaction and to newly load boron carbide as a raw material. In contrast, such a continuous-type reaction as described above enables boron trichloride to be continuously produced, and therefore has a low cost and excellent productivity. Thus, the continuous-type reaction is preferred for industrial production of boron trichloride.

The method of producing boron trichloride of the present embodiment will be described in more detail below.

The size of the particles of the particulate boron carbide is not particularly limited, but the average particle diameter D50 of the particulate boron carbide based on a volume is preferably set at less than 500 μm, more preferably at less than 100 μm, and still more preferably at less than 50 μm. The smaller size of the particles of the boron carbide results in easier flow of the boron carbide, and therefore inhibits heat storage in the reaction container and damage to the reaction container. When the time of contact between the boron carbide and the gas containing the chlorine gas is short, the smaller size of the particles of the boron carbide causes reaction to proceed up to portions closer to the centers of the particles of the boron carbide, and allows the reaction rate of the boron carbide to be more easily increased.

In addition, the average particle diameter D50 of the particles of the boron carbide based on a volume is preferably set at 10 nm or more, more preferably at 100 nm or more, and still more preferably 500 nm or more. When the average particle diameter D50 of the particles of the boron carbide based on a volume is in such a range as described above, there is a less influence of static electricity, and the boron carbide is inhibited from adhering to the reaction container. Moreover, it may be difficult to handle boron carbide having an average particle diameter D50 of less than 100 nm based on a volume.

An average particle diameter D50 in the present invention means a particle diameter in which an integrated frequency based on a smaller particle diameter in an integrated particle size distribution based on a volume is 50%. D50 can be measured by a laser diffraction method or the like. D50 can be measured using, for example, a laser diffraction/scattering-type particle size distribution measurement apparatus MICROTRAC MT3300EX manufactured by MicrotracBEL Corp. For example, ethanol can be used as a dispersion solvent in which the particulate boron carbide is dispersed in the case of the measurement.

In view of the above, an inexpensive fine boron carbide powder for a polishing material can be used in the method of producing boron trichloride of the present embodiment.

Moreover, the boron carbide used in the method of producing boron trichloride of the present embodiment preferably has a low moisture content. Water contained in the boron carbide reacts with boron trichloride to generate boric acid. The generated boric acid may blockade a line such as the pipe of an apparatus for producing boron trichloride.

The moisture content of the boron carbide is preferably less than 1% by mass, and more preferably less than 0.2% by mass. Since the moisture content of particulate boron carbide is commonly not less than 1% by mass, it is preferable that the particulate boron carbide is dried before being subjected to reaction, to decrease the moisture content. A method in which the boron carbide is dried is not particularly limited. As the method, a common drying method such as heat drying can be adopted.

The temperature of the reaction between the chlorine gas in the gas containing the chlorine gas and the boron carbide is not particularly limited as long as being a temperature at which the reaction proceeds. For sufficiently increasing the reaction rate of the boron carbide, the temperature is preferably set at 600° ° C. or more, and more preferably at 800° C. or more. For reducing an energy cost while suppressing damage to the reaction container, the temperature of the reaction between the chlorine gas in the gas containing the chlorine gas and the boron carbide is preferably set at 1200° C. or less, and more preferably at 1100° C. or less.

A method in which the temperature of the gas containing the chlorine gas and the boron carbide is set at the reaction temperature described above is not particularly limited. However, for example, the gas containing the chlorine gas and the boron carbide at ordinary temperature may be introduced into the reaction container, followed by heating the gas containing the chlorine gas and the boron carbide by common heating means; or the boron carbide at ordinary temperature may be placed in the reaction container, followed by introducing the gas containing the chlorine gas at a high temperature (for example, 600° C. or more and 1200° C. or less) into the reaction container.

The reaction pressure between the chlorine gas in the gas containing the chlorine gas and the boron carbide is not particularly limited. However, the reaction pressure is preferably set at 0.500 MPaG or less to sufficiently keep the airtightness of the reaction container. Moreover, the reaction pressure is preferably set at −0.050 MPaG or more to sufficiently increase the reaction rate of the boron carbide.

As the gas containing the chlorine gas, used in the method of producing boron trichloride of the present embodiment, a mixed gas consisting of 50% by volume or more and less than 100% by volume of chlorine gas and the remainder inert gas can be used, a mixed gas consisting of 90% by volume or more and less than 100% by volume of chlorine gas and the remainder inert gas is preferably used, and 100% by volume of chlorine gas containing no inert gas is more preferably used. When a mixed gas consisting of chlorine gas and inert gas is used as the gas containing the chlorine gas, generated boron trichloride and the inert gas coexist, and it is necessary to separate the boron trichloride and the inert gas from each other. The kind of the inert gas usable as the mixed gas is not particularly limited, and examples of the inert gas include nitrogen gas, argon, and helium.

Moreover, the low content of water vapor in the gas containing the chlorine gas, used in the method of producing boron trichloride of the present embodiment, is preferred by reason of the case of the boron carbide. The content of water vapor in the gas containing the chlorine gas is preferably less than 1% by volume, and more preferably less than 100 ppm by volume. It is preferable that the gas containing the chlorine gas is dried before being subjected to the reaction, to decrease the content of the water vapor.

A method in which the gas containing the chlorine gas is dried is not particularly limited, but the gas containing the chlorine gas can be dried, for example, by bringing the gas containing the chlorine gas into contact with a drying agent. Examples of the drying agent include zeolites, and specific examples of the drying agent include molecular sieves 3A, molecular sieves 4A, high-silica zeolite AW300, and high-silica zeolite AW500. The zeolites may be used singly, or may be used in combination of two or more kinds of the zeolites. The drying agent may contain another constituent except the zeolites.

The amount of the used gas containing the chlorine gas is not particularly limited, but can be selected depending on the shape of the reaction container, as appropriate. For example, a pipe-shaped reaction container having an inner diameter of 10 to 100 mm and a length (the length of a portion in which reaction is performed) of 200 to 2000 mm can be used.

The amount of the used gas containing the chlorine gas per kilogram of the boron carbide is preferably set at 100 L or more, and more preferably at 2000 L or more. However, it is possible that the boron carbide supplied to the reaction container is not completely react, and unreacted boron carbide remains, depending on reaction conditions and on the shape, dimension, and the like of the reaction container. Therefore, the amount of the used gas containing the chlorine gas is adjusted according to situations, as appropriate.

The material of the reaction container is not particularly limited as long as the material is not corroded by chlorine gas, boron trichloride, hydrogen chloride, or the like. Examples of the material include quartz, graphite, metals, and ceramic.

The boron trichloride produced by the method of producing boron trichloride of the present embodiment may contain chlorine gas, oxygen gas, nitrogen gas, carbon dioxide, carbon monoxide, methane, hydrogen gas, helium, hydrogen chloride, silicon tetrachloride, and/or the like as impurities. The impurities can be removed from boron trichloride by common distillation.

The method of producing boron trichloride of the present embodiment will be described in more detail below with reference to FIG. 1 illustrating an example of an apparatus for producing boron trichloride. In FIG. 1, enlarged principal units may be illustrated for convenience in description to facilitate understanding of the features of the present invention, and it is possible that the dimensional ratio and the like of each component illustrated in FIG. 1 are not the same as those of the actual apparatus for producing boron trichloride.

The apparatus for producing boron trichloride illustrated in FIG. 1 includes a chlorine gas container 1 (for example, a cylinder) filled with chlorine gas, a nitrogen gas container 2 (for example, a cylinder) filled with nitrogen gas as an inert gas, a drying apparatus 3 configured to dry the chlorine gas and the inert gas, a pipe-shaped reaction container 5 made of quartz, in which reaction between a gas containing chlorine gas and particulate boron carbide 4 is performed, a supply apparatus 6 (for example, a feeder) configured to supply the particulate boron carbide 4 to the pipe-shaped reaction container 5, a temperature sensor 7 (for example, a thermocouple) configured to measure the temperature of the interior of the pipe-shaped reaction container 5, a heating apparatus 8 configured to heat the pipe-shaped reaction container 5, and a Fourier transform infrared spectroscopic apparatus 9 configured to be capable of analyzing boron trichloride, water vapor, hydrogen chloride, and the like in gas.

The pipe-shaped reaction container 5 is placed so that the central axis of the pipe-shaped reaction container 5 is along a vertical direction. A pipe 10 configured to extend from the drying apparatus 3 is connected to the lower end of the pipe-shaped reaction container 5 via a flange 11 for connection. Moreover, a pipe 20 configured to extend to the Fourier transform infrared spectroscopic apparatus 9 is connected to the upper end of the pipe-shaped reaction container 5 via a flange 21 for connection. For example, an infrared spectrophotometric apparatus Nicolet iS5 from Thermo Fisher Scientific K.K. can be used as the Fourier transform infrared spectroscopic apparatus 9.

The flanges 11 and 21 for connection are configured to be able to be cooled by a cooling apparatus 23. In other words, a pipe 24 for cooling, included in the cooling apparatus 23, is placed to come into contact with the flanges 11 and 21 for connection, and the flanges 11 and 21 for connection are configured to be cooled by circulating a refrigerant such as cooling water through the pipe 24 for cooling by the cooling apparatus 23.

The drying apparatus 3 includes: a pipe-shaped drying container 32 in which a drying agent 31 such as zeolite is housed; and a heating apparatus 33 configured to heat the drying container 32. The material of the drying container 32 is, for example, a metal such as SUS316. When the drying ability of the drying agent 31 is deteriorated by subjecting the drying agent 31 to drying of chlorine gas and an inert gas, resulting in absorption of water by the drying agent 31, the drying ability of the drying agent 31 can be regenerated by stopping supply of the chlorine gas, heating the drying container 32 to increase the temperature of the drying agent 31 to, for example, 200° C. by the heating apparatus 33, and burning the drying agent 31, for example, for ten hours under the flow of an inert gas.

When boron trichloride is produced, first, chlorine gas is introduced from the chlorine gas container 1 into the pipe-shaped reaction container 5 through a pipe 12 and the pipe 10. When a mixed gas in which the chlorine gas is diluted with the inert gas is introduced into the pipe-shaped reaction container 5, the chlorine gas and the nitrogen gas are mixed in the intermediate portion of the pipe 12 (i.e., in a more upstream side than the pipe-shaped reaction container 5), and the mixed gas prepared in the pipe 12 is introduced into the pipe-shaped reaction container 5 through the pipe 10. In other words, a pipe 13 through which the nitrogen gas container 2 and the intermediate portion of the pipe 12 communicate with each other is arranged so that the nitrogen gas is introduced from the nitrogen gas container 2 into the intermediate portion of the pipe 12 through the pipe 13 to mix the chlorine gas and the nitrogen gas.

Since the drying apparatus 3 is arranged between the pipe 10 and the pipe 12, the chlorine gas or the mixed gas (hereinafter, both the gases are collectively referred to as "gas containing chlorine gas") passes through the interior of the drying container 32 of the drying apparatus 3, and is then introduced into the pipe-shaped reaction container 5. Thus, the gas containing the chlorine gas comes into contact with the drying agent 31 in the drying container 32, is dried, and is then introduced into the pipe-shaped reaction container 5.

The particulate boron carbide 4 is supplied to the pipe-shaped reaction container 5 by the supply apparatus 6, and comes into contact with the gas containing the chlorine gas in the pipe-shaped reaction container 5. Since the interior of the pipe-shaped reaction container 5 is heated to a desired temperature (for example, a temperature of 600° C. or more) by the heating apparatus 8, the chlorine gas in the gas containing the chlorine gas and the boron carbide 4 come into contact with each other to react with each other to generate boron trichloride in the pipe-shaped reaction container 5. The generated boron trichloride is fed out with the gas containing the chlorine gas, and exhausted from the upper end of the pipe-shaped reaction container 5.

The temperature (i.e., reaction temperature) of the interior of the pipe-shaped reaction container 5 can be controlled by regulating the output of the heating apparatus 8 on the basis of a temperature measured by the temperature sensor 7. The temperature sensor 7 is preferably placed, for example, to measure the temperature of the center in the axis direction of the interior of the pipe-shaped reaction container 5. For example, when the temperature sensor 7 is a thermocouple, the temperature measuring junction of the thermocouple is preferably arranged in the center in the axis direction of the interior of the pipe-shaped reaction container 5.

Moreover, the pressure (i.e., reaction pressure) of the interior of the pipe-shaped reaction container 5 can be regulated based on pressures measured by pressure sensors 15 and 26. The pressure sensors 15 and 26 are preferably placed, for example, in the vicinity of the lower end of the pipe-shaped reaction container 5 in the pipe 10 and in the vicinity of the upper end of the pipe-shaped reaction container 5 in the pipe 20, respectively.

The boron carbide 4 is supplied from the upper end to the pipe-shaped reaction container 5 by the supply apparatus 6. The pipe-shaped reaction container 5 is placed so that the central axis of the pipe-shaped reaction container 5 is along a vertical direction. Therefore, the boron carbide 4 supplied from the upper end drops downward from the upper portion in the pipe-shaped reaction container 5. In contrast, the gas containing the chlorine gas is introduced from the lower end of the pipe-shaped reaction container 5. Therefore, the gas containing the chlorine gas flows in the opposite direction with respect to the direction of the movement of the boron carbide, and a state in which the particulate boron carbide 4 flows in the gas containing the chlorine gas is achieved. For example, in the case of a pipe-shaped reaction container having an inner diameter of 10 to 1000 mm and a length (the length of a portion in which reaction is performed) of 200 to 2000 mm, the flow rate of the gas containing the chlorine gas can be selected in a range of 500 to 10000 ccm ($cm^3$/min), as appropriate.

By allowing the direction of the flow of the gas containing the chlorine gas and the direction of the movement of the boron carbide 4 to be opposite to each other, the movement velocity of the boron carbide 4 is decreased, the residence time of the boron carbide 4 in the reaction container is prolonged, and therefore, the reaction rate of the boron carbide 4 becomes higher. In the case of achieving the state in which the particulate boron carbide 4 flows in the gas containing the chlorine gas, the gas containing the chlorine gas may also be introduced from the upper end of the pipe-shaped reaction container 5 in a manner similar to the manner of the boron carbide 4. In this case, the gas containing the chlorine gas, containing generated boron trichloride, is exhausted from the lower end of the pipe-shaped reaction container 5.

Depending on reaction conditions and on the shape, dimension, and the like of the pipe-shaped reaction container 5, there is a case in which a total amount of the boron carbide 4 supplied to the pipe-shaped reaction container 5 reacts, or there is a case in which a total amount of the boron carbide 4 is unable to react and in which unreacted boron carbide 4 remains. The remaining particles of the boron carbide 4 drop to the lower end of the pipe-shaped reaction container 5, and are recovered in a receiving container 28 that is placed below the pipe-shaped reaction container 5 and that communicates with the lower end of the pipe-shaped reaction container 5.

Together with the gas containing the chlorine gas, the boron trichloride exhausted from the upper end of the pipe-shaped reaction container 5 passes through the Fourier transform infrared spectroscopic apparatus 9, is then supplied to the outside of the apparatus for producing boron trichloride through the pipe 20, and is subjected to a posttreatment step such as a purification step. In the Fourier transform infrared spectroscopic apparatus 9, boron trichloride and the like can be analyzed, and therefore, the purity, yield amount, yield rate, and the like of the boron trichloride can be calculated.

Figure 2:
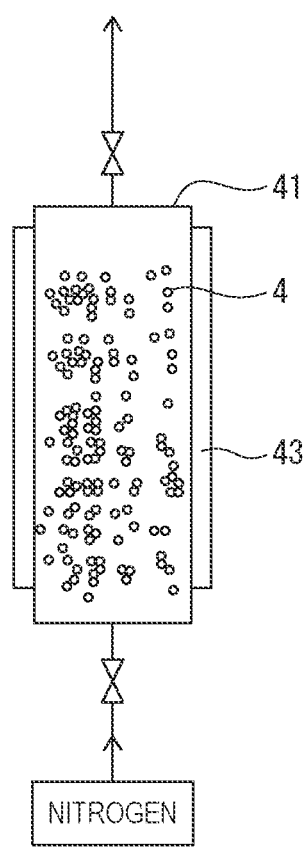
FIG. 2 is a schematic view of drying equipment configured to dry particulate boron carbide.

The boron carbide 4 may contain moisture, and therefore, it is preferable that the boron carbide 4 is dried and then subjected to the reaction. The boron carbide 4 can be dried by, for example, drying equipment illustrated in FIG. 2. The drying equipment illustrated in FIG. 2 includes: a metallic container 41 with airtightness; and a heater 43 configured to heat the metallic container 41. The metallic container 41 is filled with the particulate boron carbide 4, the metallic container 41 is heated by the heater 43 to increase the temperature of the metallic container 41 to, for example, 200° C. while allowing nitrogen gas to flow through the metallic container 41, and the temperature is kept for, for example, 4 hours. After the end of the drying, the metallic container 41 is cooled to room temperature, and the boron carbide 4 in the metallic container 41 is moved to the supply apparatus 6 of the apparatus for producing boron trichloride, and is subjected to reaction.

EXAMPLES

Examples and Comparative Example will be described below, and the present invention will be more specifically described.

Example 1

Particulate boron carbide and a gas containing chlorine gas were allowed to react with each other, to produce boron trichloride, by performing manipulation similar to the manipulation of the embodiment described above, using an apparatus for producing boron trichloride, of which the configuration was similar to that of the apparatus for producing boron trichloride in FIG. 1. A pipe-shaped reaction container has a diameter of 38 mm and a length of 1400 mm, and the material of the pipe-shaped reaction container is quartz. Detailed explanations will be given below.

A commercially available high-purity chlorine gas having a purity of 99.999% by volume and a water vapor content of 0.9 ppm by volume was used as the gas containing chlorine gas.

As the boron carbide, particulate boron carbide having a D50 of 20.88 µm measured by a laser diffraction method (manufacturing company name: RIKEN CORUNDUM CO., LTD.) was used. The boron carbide was dried using the drying equipment illustrated in FIG. 2. The drying conditions are conditions, similar to the conditions described above, in that a temperature was 200° C., and the temperature was kept for 4 hours under the flow of nitrogen gas.

A drying agent 31 housed in a drying container 32 was high-silica zeolite AW500 (manufacturing company name: UNION SHOWA K.K.), which was burnt under the flow of nitrogen gas at 200° C. for 10 hours.

Before starting reaction, nitrogen gas was allowed to flow from a nitrogen gas container 2 through the entire apparatus for producing boron trichloride at a flow rate of 1500 ccm, and purging was performed for 1 hour or more. In the purging, a pipe-shaped reaction container 5 was heated to 800° C. (set temperature) by a heating apparatus 8 while cooling flanges 11 and 21 for connection by a cooling apparatus 23.

After the purging, the flow of the nitrogen gas was stopped, and chlorine gas was introduced from a chlorine gas container 1 into the pipe-shaped reaction container 5. In a state in which a temperature was 25° C. and a pressure was 0 MPaG (a pressure of one atmosphere), the flow rate of the chlorine gas was set at 1800 ccm ($cm^3$/min), and boron carbide was supplied from a supply apparatus 6 to the pipe-shaped reaction container 5 at a rate of 1 g/min to allow the chlorine gas and the boron carbide to react with each other for 2 hours. A flow rate of the chlorine gas of 1800 ccm is equivalent to 4.42 mol/h on a mole basis, and a supply rate of the boron carbide of 1 g/min is equivalent to 1.085 mol/h on a mole basis.

Since an excessive amount of the boron carbide is supplied, boron trichloride in an amount depending on the flow rate of the chlorine gas is generated. Assuming that the chlorine gas has a conversion rate of 100%, a selective rate of 100%, and a yield rate of 100%, the generation rate of the boron trichloride is 2.94 mol/h (4.42 mol/h×4/6).

The set temperature of the heating apparatus 8 was 800° C. However, the temperature of the interior of the pipe-shaped reaction container 5, measured by the temperature sensor 7 in the reaction, was 807° C., and there was almost no difference between the temperature and the set temperature.

In other words, in Example 1, since the reaction was performed in a state in which the particulate boron carbide flows in the gas containing the chlorine gas, heat storage was inhibited in the pipe-shaped reaction container 5, and the temperature of the interior of the pipe-shaped reaction container 5 did not increase to a high temperature different from the set temperature. As a result, damage to the pipe-shaped reaction container 5 due to the high temperature did not occur in Example 1.

Chlorine gas containing the generated boron trichloride was supplied to a Fourier transform infrared spectroscopic apparatus 9 (manufacturing company name: Thermo Fisher Scientific K. K.) and subjected to analysis, to calculate the content of the boron trichloride in the chlorine gas. Analysis conditions are as follows: the material of the window plate of the Fourier transform infrared spectroscopic apparatus 9 is argentic chloride (AgCl); a cell length is 1 cm; a data interval is 0.964 $cm^{-1}$, and the number of times of scanning is 16. A wave number used for the analysis is 1908 $cm^{-1}$. In addition, the concentration of the chlorine gas was determined by titration with sodium thiosulfate. As a result of the analysis, the generation rate of the boron trichloride was 273 g/h (2.33 mol/h). Accordingly, a yield rate based on chlorine gas is 79%.

In Examples 2 to 13, reaction and analysis were performed under conditions set forth in Table 1. As set forth in Examples 2 to 5, and 12, the temperature of a pipe-shaped reaction container was set in a range of 580 to 1100° C., no damage to the pipe-shaped reaction container occurred, and boron trichloride was able to be favorably generated. Moreover, as set forth in Examples 6 to 8, the average particle diameter D50 of raw boron carbide was varied in a range of 50 nm to 480 µm, no damage to a pipe-shaped reaction container occurred, and boron trichloride was able to be favorably generated.

Further, as set forth in Examples 9, 10, and 13, the pressure of a pipe-shaped reaction container was varied in a range of −0.06 to 0.05 MPaG, no damage to a pipe-shaped reaction container occurred, and boron trichloride was able to be favorably generated. Further, as set forth in Example 11, the content of chlorine gas of a gas containing the chlorine gas was set at 50% by volume, no damage to a pipe-shaped reaction container occurred, and boron trichloride was able to be favorably generated.

| | Gas Containing Chlorine Gas | | | Boron Carbide | | | Pipe-Shaped Reaction Container | | | | Boron Trichloride | | |
|---|---|---|---|---|---|---|---|---|---|---|---|---|---|
| | Kind of Gas | Flow Rate (ccm) | Flow Rate (mol/h) | D50 (μm) | Supply Rate (g/min) | Supply Rate (mol/h) | Pressure (MPaG) | Set Temperature (° C.) | Measured Temperature (° C.) | Damage | Generation Rate (g/h) | Generation Rate (mol/h) | Yield Rate (%) |
| Example 1 | High-Purity Chlorine Gas | 1800 | 4.42 | 20.88 | 1 | 1.085 | 0 | 800 | 807 | Absent | 273 | 2.33 | 79 |
| Example 2 | High-Purity Chlorine Gas | 1800 | 4.42 | 20.88 | 1 | 1.085 | 0 | 900 | 910 | Absent | 320 | 2.73 | 93 |
| Example 3 | High-Purity Chlorine Gas | 1800 | 4.42 | 20.88 | 1 | 1.085 | 0 | 1000 | 1008 | Absent | 321 | 2.74 | 94 |
| Example 4 | High-Purity Chlorine Gas | 1800 | 4.42 | 20.88 | 1 | 1.085 | 0 | 1100 | 1108 | Absent | 321 | 2.74 | 93 |
| Example 5 | High-Purity Chlorine Gas | 1800 | 4.42 | 20.88 | 1 | 1.085 | 0 | 600 | 610 | Absent | 210 | 1.79 | 61 |
| Example 6 | High-Purity Chlorine Gas | 1800 | 4.42 | 489 | 1 | 1.085 | 0 | 1000 | 1010 | Absent | 249 | 2.13 | 74 |
| Example 7 | High-Purity Chlorine Gas | 1800 | 4.42 | 100 nm | 1 | 1.085 | 0 | 1000 | 1007 | Absent | 321 | 2.74 | 94 |
| Example 8 | High-Purity Chlorine Gas | 1800 | 4.42 | 50 nm | 1 | 1.085 | 0 | 1000 | 1009 | Absent | 282 | 2.41 | 82 |
| Example 9 | High-Purity Chlorine Gas | 1800 | 4.42 | 20.88 | 1 | 1.085 | −0.05 | 1000 | 1008 | Absent | 287 | 2.45 | 84 |
| Example 10 | High-Purity Chlorine Gas | 1800 | 4.42 | 20.88 | 1 | 1.085 | 0.05 | 1000 | 1010 | Absent | 322 | 2.75 | 94 |
| Example 11 | 50% Chlorine Gas | 1800 | 4.42 | 20.88 | 1 | 1.085 | 0 | 1000 | 1003 | Absent | 157 | 1.34 | 92 |
| Example 12 | High-Purity Chlorine Gas | 1800 | 4.42 | 20.88 | 1 | 1.085 | 0 | 580 | 581 | Absent | 19 | 0.16 | 5.6 |
| Example 13 | High-Purity Chlorine Gas | 1800 | 4.42 | 20.88 | 1 | 1.085 | −0.06 | 1000 | 1008 | Absent | 76 | 0.65 | 22 |
| Comparative Example 1 | High-Purity Chlorine Gas | 567 | 1.39 | 1-3 mm | Excessive Amount | Excessive Amount | 0 | 850 | 1210 | Present | 107 | 0.91 | 99 |

Comparative Example 1

Reaction and analysis were performed in a manner similar to the manner of Example 1 except that: granular boron carbide having a particle diameter of 1 to 3 mm was used as raw boron carbide, and the reaction was performed in a state in which boron carbide did not flow in a gas containing chlorine gas; the set temperature of a heating apparatus 108 configured to heat a pipe-shaped reaction container 105 was 850° C.; and the flow rate of chlorine gas was 567 ccm.

Figure 3:
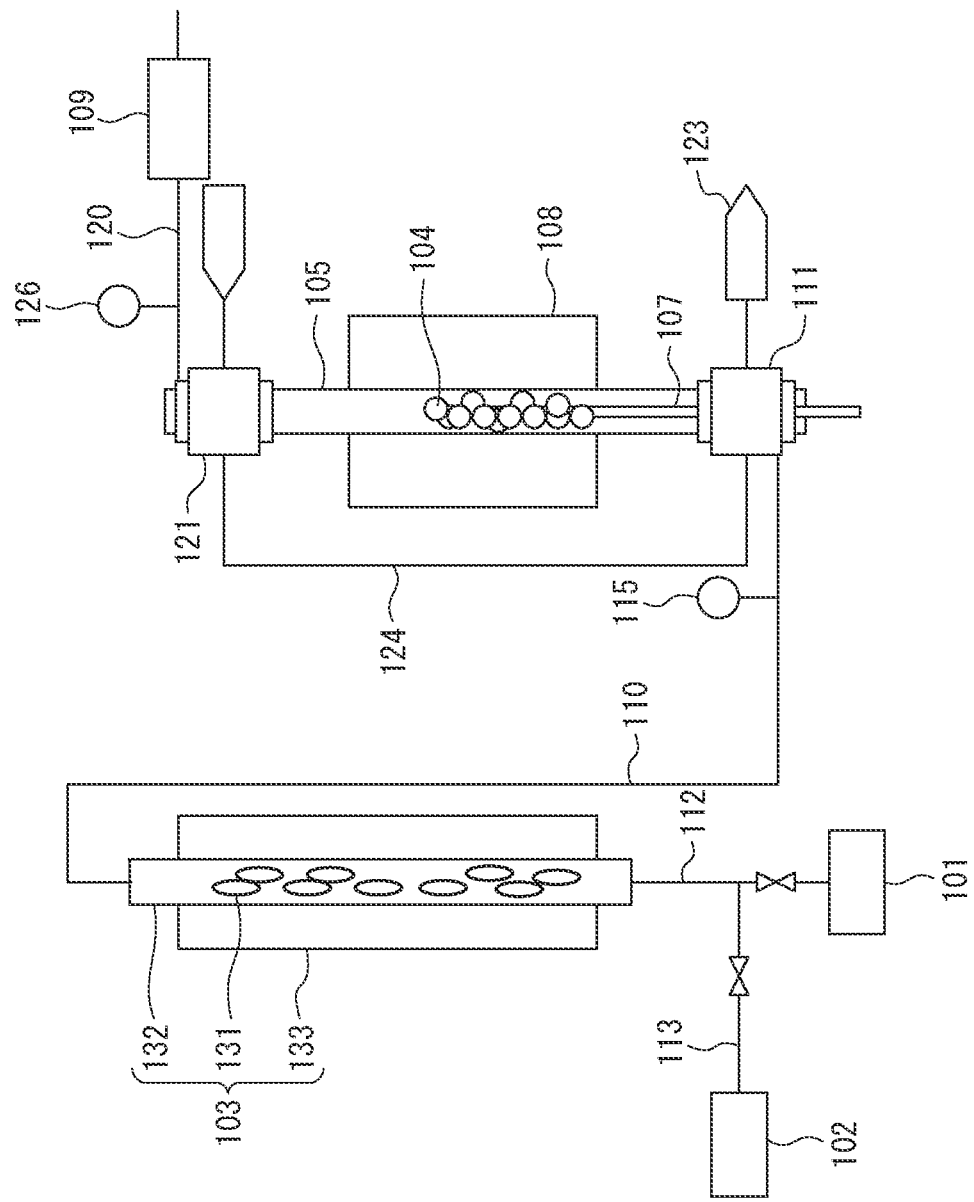
FIG. 3 is a schematic view of an apparatus for producing boron trichloride, used in Comparative Example.

In other words, an apparatus for producing boron trichloride, illustrated in FIG. 3, was used, the pipe-shaped reaction container 105 was filled with boron carbide 104 prior to the start of the reaction, and the reaction was performed in a state in which the position of the boron carbide 104 was not moved but fixed, rather than performing the reaction while dropping boron carbide 104.

In FIG. 3, reference numeral 101 denotes a chlorine gas container, reference numeral 102 denotes a nitrogen gas container, reference numeral 103 denotes a drying apparatus, reference numeral 107 denotes a temperature sensor, reference numeral 109 denotes a Fourier transform infrared spectroscopic apparatus, reference numerals 110, 112, 113, and 120 denote pipes, reference numerals 111 and 121 denote flanges for connection, reference numerals 115 and 126 denote pressure sensors, reference numeral 123 denotes a cooling apparatus, reference numeral 124 denotes a pipe for cooling, reference numeral 131 denotes a drying agent, reference numeral 132 denotes a drying container, and reference numeral 133 denotes a heating apparatus.

As a result, the reaction between the boron carbide and the chlorine gas proceeded from the lower portion toward upper portion of the pipe-shaped reaction container 105 at a rate of about 1 cm/h. The temperature of a reaction point (hot spot) measured by the temperature sensor 107 in the reaction was 1210° C., which was greatly different from the set temperature. In other words, it was considered that in Comparative Example 1, the reaction was performed in a state in which the position of the boron carbide was not moved but fixed, and therefore, heat storage easily occurred in the pipe-shaped reaction container 105, and the temperature of the interior of the pipe-shaped reaction container 105 increased to a high temperature different from the set temperature. As a result, damage to the pipe-shaped reaction container 105 due to the high temperature occurred in Comparative Example 1.

About 5 hours after the start of the reaction, the amount of generated boron trichloride reached zero, and the reaction ended. As a result of the analysis, the content of boron trichloride in the chlorine gas was not less than 95% by volume, and the rate of the generated boron trichloride was 117 g/h.

REFERENCE SIGNS LIST

1 Chlorine gas container
2 Nitrogen gas container
4 Boron carbide
5 Pipe-shaped reaction container
5 Supply apparatus
8 Heating apparatus
9 Fourier transform infrared spectroscopic apparatus

The invention claimed is:

1. A method of producing boron trichloride, comprising performing reaction between chlorine gas in a gas containing the chlorine gas and particulate boron carbide in a state in which the boron carbide flows in the gas containing the chlorine gas, wherein,
in the performing the reaction, the boron carbide is dropped from an upper portion of a reaction container to a bottom portion of the reaction container, and the gas containing the chlorine gas is introduced into the reaction container to flow in an opposing direction with respect to a direction of movement of the boron carbide, and
the reaction between the chlorine gas in the gas containing the chlorine gas and the boron carbide is continuously performed, while continuously supplying the gas containing chlorine gas and the boron carbide into the reaction container and continuously exhausting a reaction product, and while an unreacted boron carbide from the reaction container drops to a receiving container that is placed below the reaction container and that communicates with a lower end of the reaction container.

2. The method of producing boron trichloride according to claim 1, wherein the boron carbide has an average particle diameter D50 of less than 500 μm based on a volume.

3. The method of producing boron trichloride according to claim 1, wherein the reaction between the chlorine gas in the gas containing the chlorine gas and the boron carbide is performed at a temperature of 600° ° C. or more.

4. The method of producing boron trichloride according to claim 1, wherein the reaction between the chlorine gas in the gas containing the chlorine gas and the boron carbide is performed under a pressure of −0.050 MPaG or more and 0.500 MPaG or less.

5. The method of producing boron trichloride according to claim 1, wherein the gas containing the chlorine gas consists of 50% by volume or more and 100% by volume or less of the chlorine gas, and a remainder inert gas.

6. The method of producing boron trichloride according to claim 1, wherein a content of water vapor in the gas containing the chlorine gas is less than 1% by volume.

7. The method of producing boron trichloride according to claim 2, wherein the reaction between the chlorine gas in the gas containing the chlorine gas and the boron carbide is performed at a temperature of 600° ° C. or more.

8. The method of producing boron trichloride according to claim 2, wherein the reaction between the chlorine gas in the gas containing the chlorine gas and the boron carbide is performed under a pressure of −0.050 MPaG or more and 0.500 MPaG or less.

9. The method of producing boron trichloride according to claim 3, wherein the reaction between the chlorine gas in the gas containing the chlorine gas and the boron carbide is performed under a pressure of −0.050 MPaG or more and 0.500 MPaG or less.

10. The method of producing boron trichloride according to claim 2, wherein the gas containing the chlorine gas consists of 50% by volume or more and 100% by volume or less of the chlorine gas, and a remainder inert gas.

11. The method of producing boron trichloride according to claim 3, wherein the gas containing the chlorine gas consists of 50% by volume or more and 100% by volume or less of the chlorine gas, and a remainder inert gas.

12. The method of producing boron trichloride according to claim 4, wherein the gas containing the chlorine gas consists of 50% by volume or more and 100% by volume or less of the chlorine gas, and a remainder inert gas.

13. The method of producing boron trichloride according to claim 2, wherein a content of water vapor in the gas containing the chlorine gas is less than 1% by volume.

14. The method of producing boron trichloride according to claim 3, wherein a content of water vapor in the gas containing the chlorine gas is less than 1% by volume.

* * * * *